US009990103B2

(12) United States Patent
Park et al.

(10) Patent No.: US 9,990,103 B2
(45) Date of Patent: Jun. 5, 2018

(54) DIGITAL DEVICE AND METHOD OF CONTROLLING THEREFOR

(71) Applicant: LG ELECTRONICS INC., Seoul (KR)

(72) Inventors: Hyorim Park, Seoul (KR); Doyoung Lee, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 13/900,059

(22) Filed: May 22, 2013

(65) Prior Publication Data

US 2014/0317572 A1 Oct. 23, 2014

(30) Foreign Application Priority Data

Apr. 19, 2013 (KR) ........................ 10-2013-0043588

(51) Int. Cl.
*G06F 3/0481* (2013.01)
*G06F 3/0484* (2013.01)
*G06F 3/0488* (2013.01)
*G06F 1/16* (2006.01)

(52) U.S. Cl.
CPC ........ *G06F 3/04817* (2013.01); *G06F 1/1647* (2013.01); *G06F 3/0488* (2013.01); *G06F 3/04812* (2013.01); *G06F 3/04842* (2013.01)

(58) Field of Classification Search
None
See application file for complete search history.

(56) References Cited

U.S. PATENT DOCUMENTS

| 6,545,669 | B1 | 4/2003 | Kinawi et al. |
| 8,112,770 | B2 | 2/2012 | Horvitz et al. |
| 8,416,148 | B1 | 4/2013 | Park |
| 2006/0248399 | A1 | 11/2006 | Han |
| 2007/0191070 | A1* | 8/2007 | Rao .......................... G06F 21/32 455/566 |
| 2008/0155576 | A1* | 6/2008 | Horvitz ................. G06F 9/4443 719/328 |
| 2009/0307631 | A1* | 12/2009 | Kim .................... G06F 3/04883 715/830 |
| 2010/0037104 | A1* | 2/2010 | Jung .................. G03G 15/5079 714/49 |
| 2010/0099457 | A1 | 4/2010 | Kim |
| 2010/0262928 | A1 | 10/2010 | Abbott |
| 2010/0277420 | A1* | 11/2010 | Charlier ................ G06F 3/0481 345/173 |

(Continued)

FOREIGN PATENT DOCUMENTS

CN 102053785 A 5/2011
WO WO 2012/044515 A2 4/2012

(Continued)

*Primary Examiner* — Abdullah Al Kawsar
*Assistant Examiner* — David A Spellman
(74) *Attorney, Agent, or Firm* — Birch, Stewart, Kolasch & Birch, LLP

(57) ABSTRACT

The present specification is related to a digital device including a front side display unit and a back side display unit and a method of controlling therefor, more particularly, to a method of controlling an application in the back side display unit by rotating an icon corresponding to the application in the front side display unit and a digital device therefor.

16 Claims, 14 Drawing Sheets

(56) References Cited

U.S. PATENT DOCUMENTS

| | | | |
|---|---|---|---|
| 2011/0012921 A1* | 1/2011 | Cholewin | G06F 1/1626 |
| | | | 345/619 |
| 2011/0193805 A1 | 8/2011 | Park et al. | |
| 2012/0218191 A1* | 8/2012 | Huang | G06F 1/1643 |
| | | | 345/173 |
| 2012/0221966 A1 | 8/2012 | Inami et al. | |
| 2012/0260217 A1* | 10/2012 | Celebisoy | G06F 3/04815 |
| | | | 715/836 |
| 2013/0201144 A1 | 8/2013 | Miura et al. | |

FOREIGN PATENT DOCUMENTS

| | | |
|---|---|---|
| WO | WO 2012/044518 A2 | 4/2012 |
| WO | WO 2012/053516 A1 | 4/2012 |
| WO | WO 2012/078079 A2 | 6/2012 |
| WO | WO 2012/142044 A2 | 10/2012 |

* cited by examiner

FIG. 7
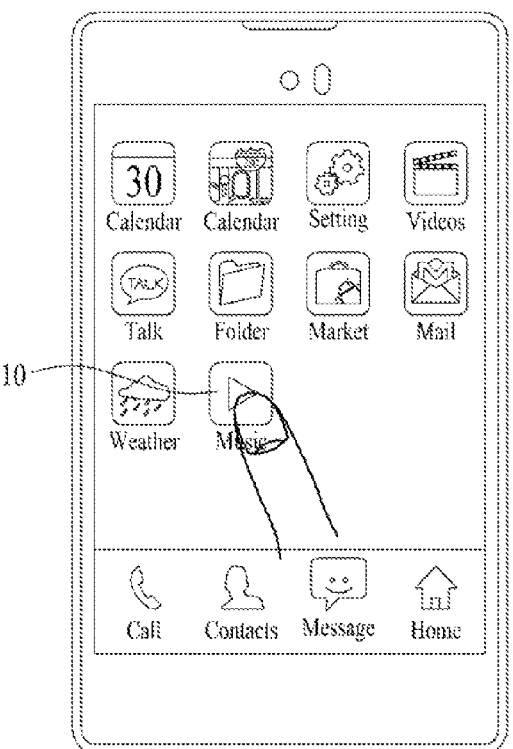
(a)
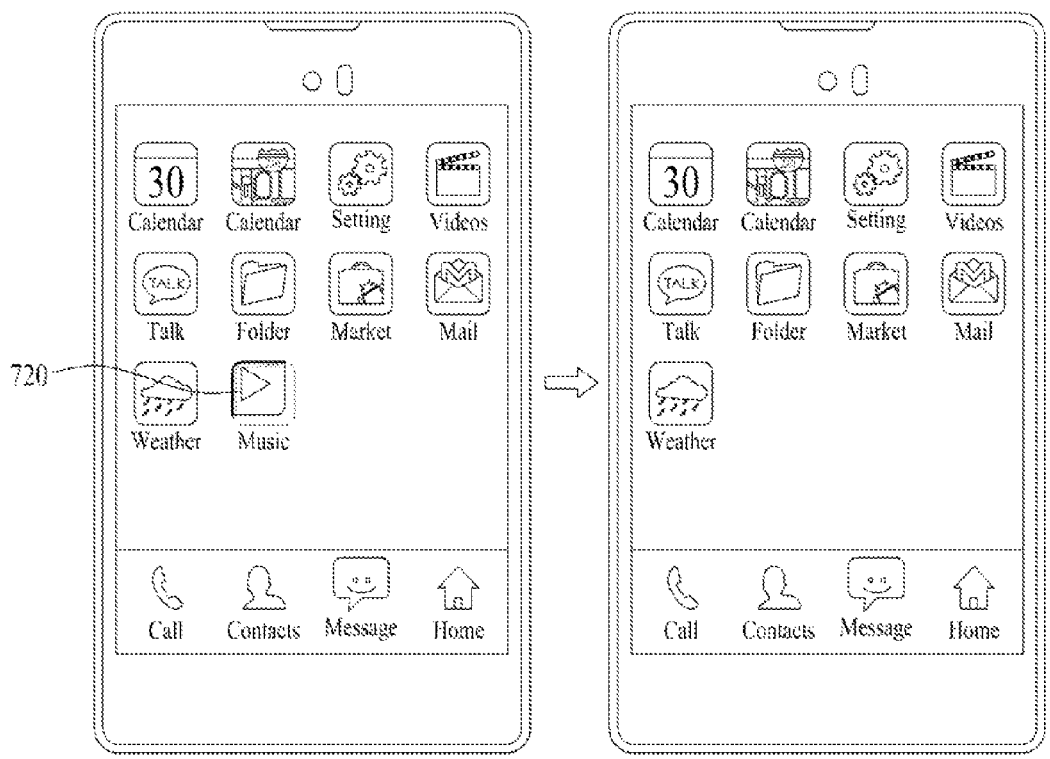
(b)        (c)

(a)　　　　　　　　(b)

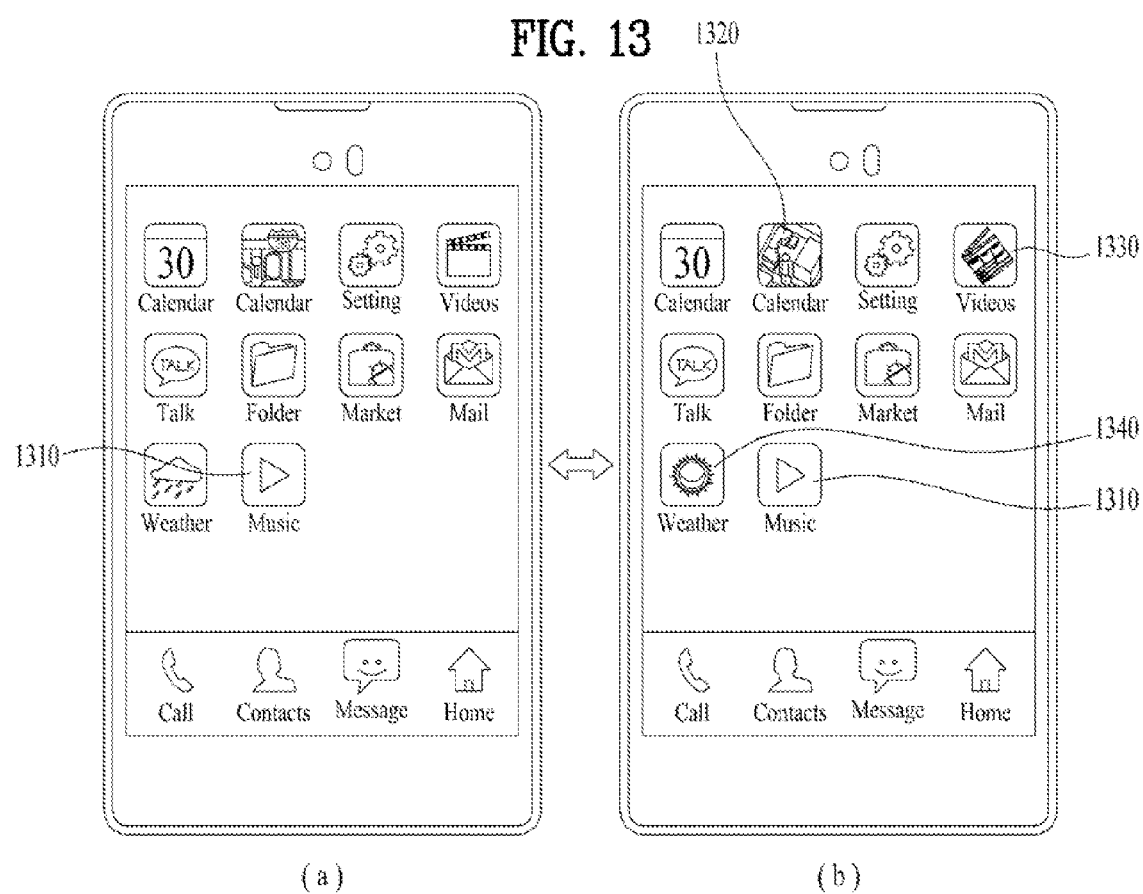

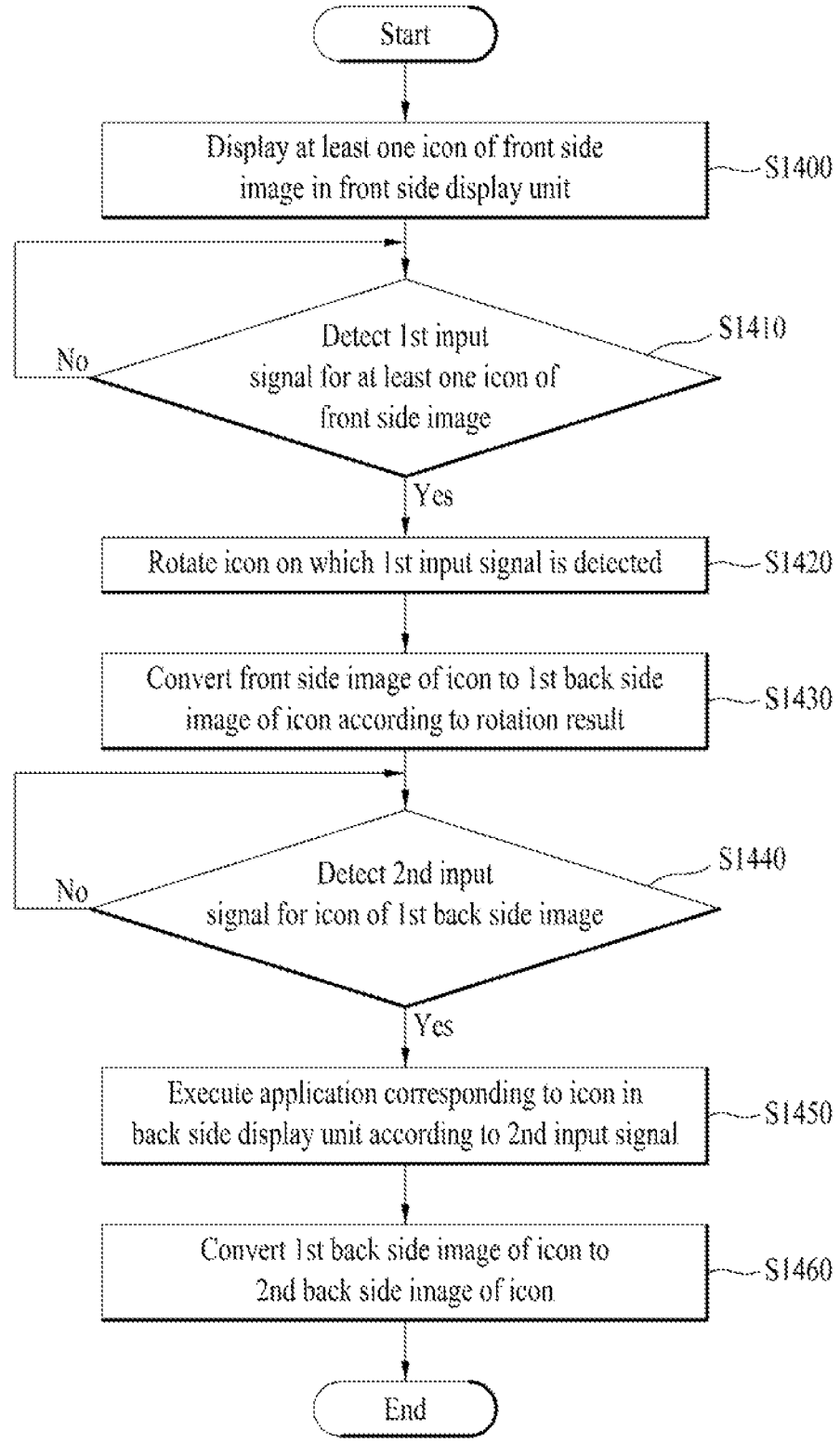

DIGITAL DEVICE AND METHOD OF CONTROLLING THEREFOR

This application claims the benefit of the Korean Patent Application No. 10-2013-0043588, filed on Apr. 19, 2013, which is hereby incorporated by reference as if fully set forth herein.

BACKGROUND OF THE INVENTION

Field of the Invention

The present specification is relates to a digital device including a front side display unit and a back side display unit and a method of controlling therefor, and more particularly, to a method of controlling an application in the back side display unit by rotating an icon corresponding to the application in the front side display unit and a digital device therefor.

Discussion of the Related Art

As an electronic display-related technology has been developed, various forms of electronic displays are releasing. And, such a digital device as a smart phone and a smart TV using the various forms of electronic display is released together. For instance, there exists a digital device including a double-sided display unit.

A front side display unit and a back side display unit can be linked with each other in the digital device including the double-sided display unit. Hence, content of the front side display unit can be seen in the back side display unit by directly moving the content. Hence, there exists a need of executing an application corresponding to an icon provided by the front side display unit in the back side display unit as well as the content currently displayed in the front side display unit.

And, currently, it is necessary to have an easy-to-use user interface to execute the application corresponding to an icon provided by the front side display in the back side display unit. And, it is also necessary to have an easy-to-use user interface to control an application executed in the back side display unit in the front side display unit.

SUMMARY OF THE INVENTION

Accordingly, the present invention is directed to an apparatus and method thereof that substantially obviate one or more problems due to limitations and disadvantages of the related art.

According to one embodiment, one object of the present specification intends to provide a digital device providing a user interface to execute an application in a back side display unit by using an icon corresponding to the application in a front side display unit and a method of controlling therefor.

According to a different embodiment, another object of the present specification intends to provide a digital device providing a user interface to control an application currently executed in the back side display unit in the front side display unit and a method of controlling therefor.

According to a different embodiment, another object of the present specification intends to provide a digital device moving an icon provided in a front side display unit to a back side display unit or providing an icon duplicated in the back side display unit and a method of controlling therefor.

According to a different embodiment, further object of the present specification intends to provide a digital device providing an icon including a front side image, a first back side image, and a second back side image enabling a user to know at least one selected from the group consisting of an execution position, whether it is executable, execution status according to an image of the icon and a method of controlling therefor.

A digital device according to one embodiment includes a front side display unit, a back side display unit installed in the opposite side of the front side display unit, a sensor unit configured to sense a user input and configured to deliver a signal according to a sensed result to a processor, and the processor configured to control the front side display unit, the back side display unit, and the sensor unit. In this case, the processor is further configured to display at least one icon of a front side image in the front side display unit, detect a first input signal for the at least one icon of the front side image, rotate an icon on which the first input signal is detected, convert the front side image of the icon to a first back side image of the icon, wherein the first back side image is displayed in the front side display unit if an application corresponding to the icon is executable in the back side display unit, detect a second input signal for the icon of the first back side image, execute the application corresponding to the icon in the back side display unit according to the second input signal, and convert the first back side image of the icon to a second back side image of the icon, wherein the second back side image of the icon is displayed in the front side display unit only if the application corresponding to the icon is currently executed in the back side display unit.

A method of controlling a digital device including a front side display unit and a back side display unit according to one embodiment includes the steps of displaying at least one icon of a front side image in the front side display unit, detecting a first input signal for the at least one icon of the front side image, rotating an icon on which the first input signal is detected, converting the front side image of the icon to a first back side image of the icon, wherein the first back side image of the icon is displayed in the front side display unit if an application corresponding to the icon is executable in the back side display unit, detecting a second input signal for the icon of the first back side image, executing the application corresponding to the icon in the back side display unit according to the second input signal, and converting the first back side image of the icon to a second back side image of the icon, wherein the second back side image of the icon is displayed in the front side display unit only if the application corresponding to the icon is currently executed in the back side display unit According to one embodiment, an application corresponding to an icon provided in a front side display unit can be executed in a back side display unit by a simple input operation of a user.

And, according to a different embodiment, a user may be able to control an application currently executed in a back side display unit in a front side display unit. Hence, the user may be able to conveniently operate a digital device without separately rotating the digital device to control the application currently executed in the back side display unit.

And, according to a different embodiment, a user may be able to generate a duplicated icon to be provided to a back side display unit or move an icon to the back side display unit as an input for the icon provided in a front side display unit. Hence, the user may be able to easily configure a home screen of the front side display unit and the back side display unit with a convenient input for the icon.

And, according to a different embodiment, a user may be able to know at least one selected from the group consisting of an execution position, whether it is executable, execution status according to an image (a front side image, a first back side image, and a second back side image) of an icon.

More specific effects of the invention shall be described in detail in the following description.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is one embodiment moving an icon of a first back side image provided in a front side display unit to a back side display unit;

FIG. 13 is one embodiment differently displaying an image of an icon in response to a multitasking application;

FIG. 14 is a flowchart for a method of controlling a digital device according to one embodiment.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present specification. Wherever possible, the same reference numbers will be used throughout the drawings to refer to the same or similar parts.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Moreover, while the embodiments have been concretely described with reference to the attached diagrams and the contents written on the diagrams, the present specification may be non-restricted or non-limited to the embodiments.

Meanwhile, a digital device described in the present specification may be able to include such a digital device of a various form capable of displaying an image and recognizing a double-sided touch as a PC, a PDA (Personal Digital Assistant), a notebook, a tablet PC, a smart phone, and the like. And, the digital device may include a touch screen in the present specification.

Figure 1:
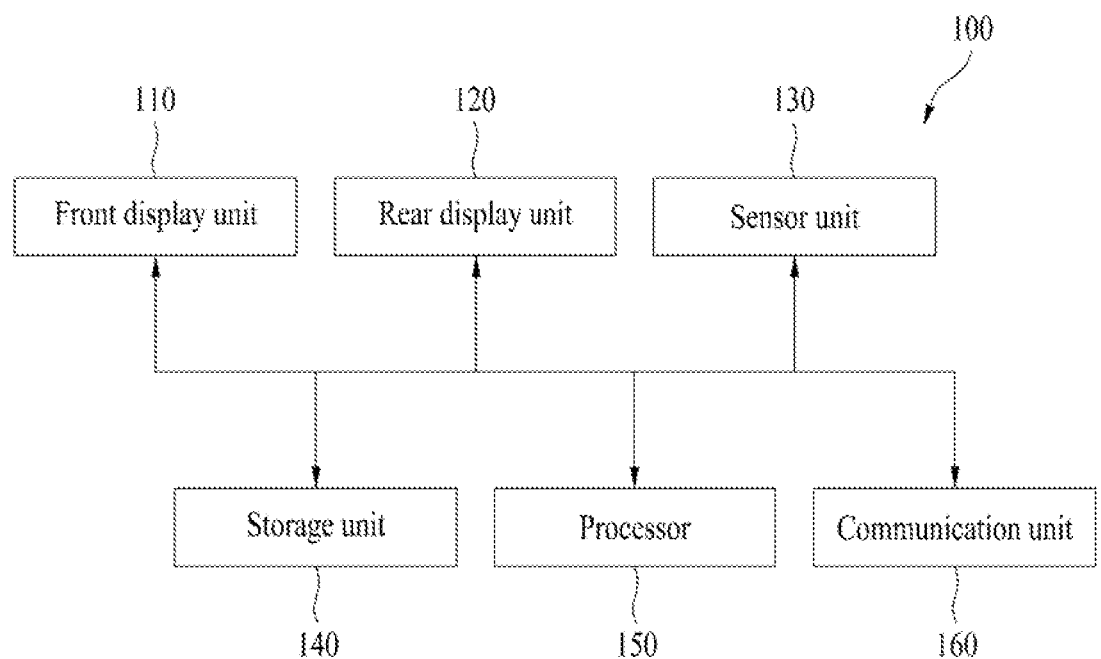
FIG. 1 is a functional block diagram of a digital device according to one embodiment.

FIG. 1 is a functional block diagram of a digital device according to one embodiment. Yet, FIG. 1 is just one embodiment. A part of configuration module can be deleted or a new configuration module can be added according to a necessity of a person engaged in the corresponding field.

As shown in FIG. 1, a digital device 100 according to one embodiment may include a front side display unit 110, a back side display unit 120, a sensor unit 130, a storage unit 140, a processor 150, and a communication unit 160.

The front side display unit 110 may be able to output an image data in a display screen. And, the front side display unit 110 may be able to output an image based on a content implemented by the processor 150, an application, or a control command of the processor 150.

The back side display unit 120 may perform an identical function of the front side display unit 11Q and may be installed in an opposite side of the front display unit 110. In this case, a double-sided display unit 110/120 installed in the digital device 100 can be configured as the front side display unit 110 and the back side display unit 120 according to a position of a user.

In particular, in case of the digital device equipped with a display unit in both sides, a front side can be defined as a side facing a user and a back side corresponds to the other side of the front side. Hence, a display unit facing the user may corresponds to the front side display unit 110 and the display unit installed in opposite side of the front display unit 110 may correspond to the back side display unit 120.

Meanwhile, the front side display unit 110 and the back side display unit 120 can be determined in advance irrespective of a position of a user. In particular, according to a configuration of the digital device 100, the front side display unit 110 and the back side display unit 120 may be fixed or may flexibly vary according to the position of the user.

In the following description, for clarity of explanation, assume that the front side display unit 110 and the back side display unit 120 are fixed irrespective of a position of a user. In this case, the user may be able to recognize the front side display unit 110 and the back side display unit 120 via a position of such a physical configuration element as an image sensor installed in the digital device, a home button, or the like.

The sensor unit 130 configured to sense a surrounding environment of a digital device 100 using at least one sensor installed in the digital device 100 and may be then able to deliver a sensed result to the processor 150 in a signal form. And, the sensor unit 130 senses a user input and may be then able to deliver a signal according to a sensed result to the processor 150. In this case, the processor 150 may be able to detect a signal generated by the user input (hereinafter abbreviated an input signal) such as the signal delivered from a touch sensor among many received signals.

Hence, the sensor unit 130 may be able to include at least one sensing means. As one embodiment, the at least one sensing means may include such a sensing means as a gravity sensor, a terrestrial magnetism sensor, a motion sensor, a gyro sensor, an acceleration sensor, an infrared sensor, a tilt (inclination) sensor, a brightness sensor, an altitude sensor, a smell sensor, a temperature sensor, a depth sensor, a pressure sensor, a bending sensor, an audio sensor, a video sensor, a GPS (global positioning system) sensor, a touch sensor, a grip sensor, and the like.

And, the sensor unit 130 is a common name for the various aforementioned sensing means. The sensor unit senses various inputs of a user and the environment of the digital device 100 and may be then able to deliver the sensed result to the processor 150 in order for the processor to perform an operation according to the sensed result. The aforementioned sensors may be included in the digital device 100 as a separate element or may be included in the digital device in a manner of being combined as at least one element.

Hence, according to one embodiment, the sensor unit 130 may be able to sense a user input for the front side and the back side of the digital device in a manner of distinguishing. In this case, the front side can be a side on which the front side display unit is installed in the digital device 100 and the back side can be the side on which the back side display unit is installed in the digital device 100.

And, in case that the aforementioned front side display unit 110 and the back side display unit 120 include a touch sensitive display; the digital device 100 may be able to sense such a user input as a touch input by the front side display unit 110 and the back side display unit 120.

Hence, the processor 150 recognizes a signal according to the user input delivered from at least one selected from the group consisting of the sensor unit 130, the front side display unit 110, and the back side display unit 120 as an input signal and may be able to control the digital device 100 according to the input signal.

In other word, the processor may be able to detect the input signal via at least one selected from the group consisting of the sensor unit 130, the front side display unit 110 and the back side display unit 120 among the signals delivered from a configuration unit. In particular, the processor 150 may be able to detect a signal generated by a user input, which is received from a specific sensor, among the signals received by the processor. For instance, if the sensor unit 130 senses a user input for the front side or the back side, the processor 150 may be able to detect the input signal using a sensed result.

In the following description, if each step or operation performed by the digital device starts or progresses by a user input, assume that a process of generating an input signal according to the user input is included in the explanation on the aforementioned process although it is not duplicately explained.

And, it may be able to express that the processor controls the digital device or the configuration unit included in the digital device according to the user input and the processor and the digital device can be explained in a manner of equating.

The storage unit 140 may be able to store such a various digital data as an audio, a picture, a video, an application, and the like. The storage unit 130 indicates such a various digital data storing space as a flash memory, a random access memory (RAM), a solid state drive (SSD), and the like.

And, the storage unit 140 may be able to temporarily store a data received from an external device via the communication unit 160. In this case, the storage unit 140 can be used for a buffering to output the data received from the external device in the digital device 100. And, the storage unit 140 may be able to store the content displayed in the digital device 100. In this case, the storage unit 140 can be selectively installed in the digital device 100.

The communication unit 160 may be able to transceive data with an external device by performing a communication using various protocols. And, the communication unit 160 accesses an external network in wired or wireless and may be then able to transceive such a digital data as content, an application, and the like.

Besides, although it is not depicted in FIG. 1, the digital device can be equipped with an audio input/output unit or a power unit.

The audio output unit (not depicted) includes such an audio output means as a speaker, earphones, and the like. And, the audio output unit may be able to output an audio based on the content implemented in the processor 150 or a control command of the processor 150. In this case, the audio output unit can be selectively installed in the digital device 100.

The power unit is a power source connected to a battery inside of the device or an external power supply and may be able to supply power to the digital device 100.

And, the digital device 100 depicted in FIG. 1 is a block diagram according to one embodiment. Blocks represented in a manner of being separated indicate the logically distinguished elements of the device. Hence, the elements of the aforementioned device can be equipped with a single chip or a plurality of chips according to the design of the device.

Figure 2:
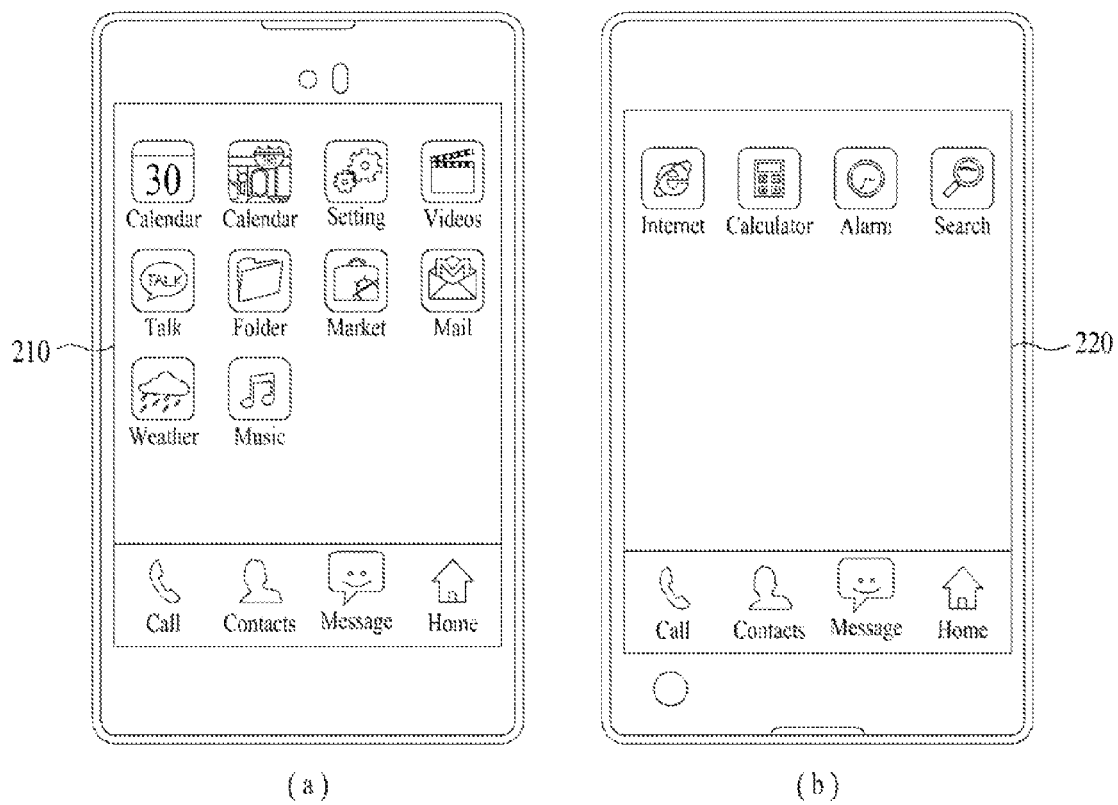
FIG. 2 is one embodiment for a front side display unit and a back side display unit of a digital device.

FIG. 2 is one embodiment for a front side display unit and a back side display unit of a digital device. FIG. 2(a) is a diagram of one embodiment of the front side display unit of the digital device and FIG. 2(b) is a diagram of one embodiment of the back side display unit of the digital device.

Whenever a user wants, the user may be able to see the front side display unit 210 or the back side display unit 220. Hence, as shown in FIG. 2, the digital device can provide a home screen via the front side display unit 210 and the back side display unit 220 as well. In this case, the home screen provided by the front side display unit 210 and the home screen provided by the back side display unit 220 may correspond to an identical home screen or a different home screen. And, the digital device may be able to sequentially provide a plurality of home screens via the front side display unit 210 and the back side display unit 220 according to the input signal of a user. And, the digital device may be able to sequentially provide a plurality of the home screens according to the input signal of the user via the front side display unit 210 and the back side display unit 220, respectively.

In case of the aforementioned case, the user may be able to configure the home screen of the front side display unit 210 and that of the back side display unit 220 and may be able to edit the configured home screen. Hence, in case that the user configures the home screen, the digital device according to one embodiment intends to provide a user interface capable of easily moving an icon corresponding to an application between the front side display unit 210 and the back side display unit 220. Hence, the digital device according to one embodiment may be able to provide the icon including at least one of a front image, a first back side image and a second back side image. This shall be described in detail with reference to FIG. 3 to FIG. 4.

Figure 3:
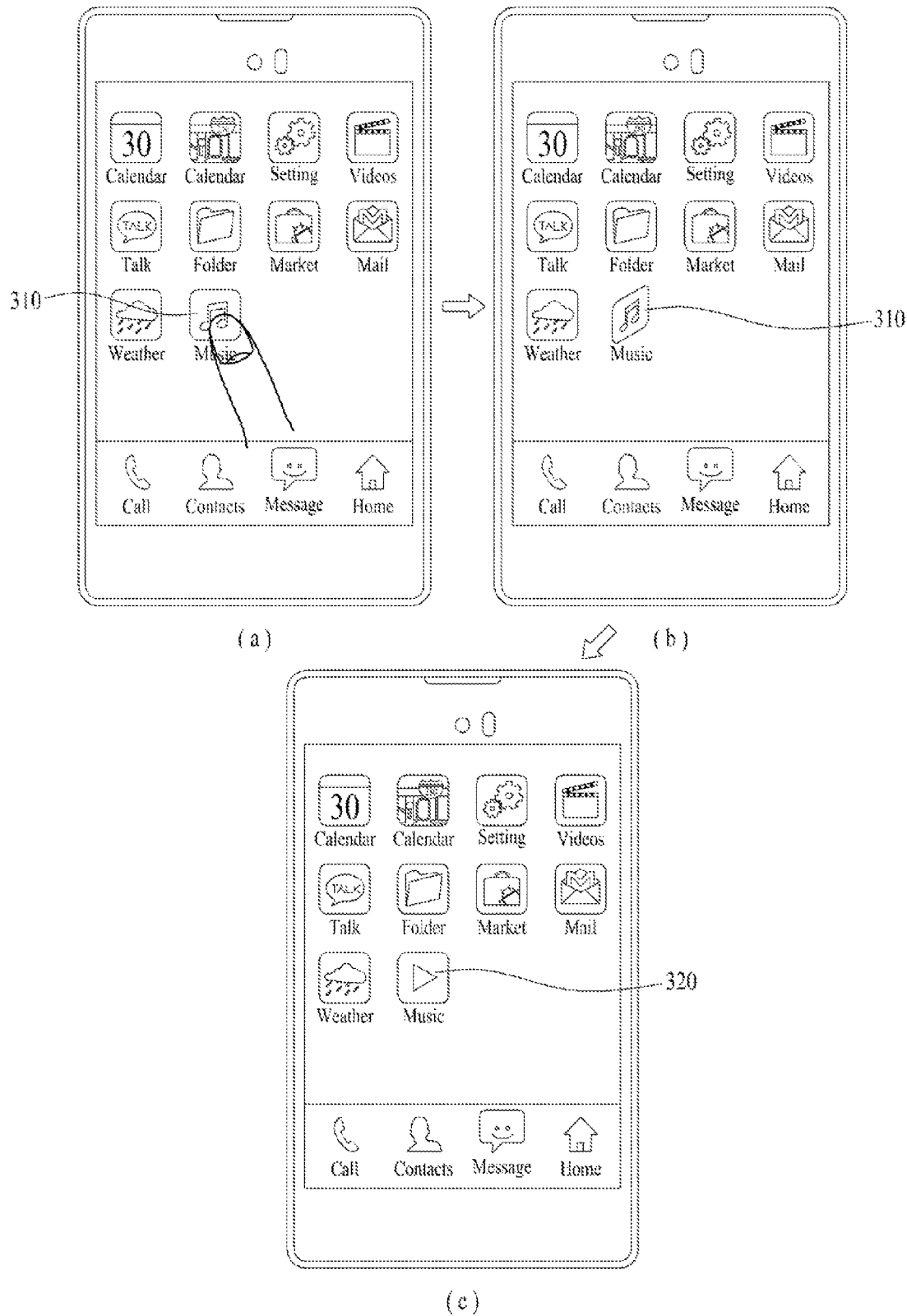
FIG. 3 is one embodiment for a front side image and a first back side image of an icon displayed in a front side display unit of a digital device.

FIG. 3 is one embodiment for a front side image and a first back side image of an icon displayed in a front side display unit of a digital device.

First of all, as shown in FIG. 3(a), the digital device may be able to display at least one icon of a front side image in the front side display unit. And, the at least one icon may correspond to an application executable in the digital device.

In this case, the digital device may be able to detect a first input signal for an icon 310. The first input signal may be able to include a signal generated by a touch input of a user for a specific icon displayed in the front side display unit. In this case, the touch input of the user may be able to include the touch input for a left region or a right region on the basis of an axis of a vertical center of the icon.

As shown in FIG. 3(b), having detected the first input signal, the digital device may be able to rotate the icon on which the first input signal is detected. In this case, the digital device may be able to rotate the icon 310 on the basis of the axis of the vertical center of the icon 310. In case that the first input signal corresponds to the signal generated by the touch input for the left region on the basis of the axis of the vertical center, the digital device may be able to rotate the icon 310 in a leftward direction. And, in case that the first input signal corresponds to the signal generated by the touch input for the right region on the basis of the axis of the vertical center, the digital device may be able to rotate the icon 310 in a rightward direction.

And, the first input signal may include a signal generated by a touch input of a user having directivity for a specific icon displayed in the front display unit. For instance, the first input signal can be generated by a flip operation of the user for the specific icon. In this case, the digital device, which detected the first input signal, may be able to rotate the icon 310 according to a flip direction.

As shown in FIG. 3(c), the digital device may be able to flip the icon 310 over according to a rotation result of the icon 310. Hence, the digital device may be able to change the front side image of the icon 310 into a first back side image 320 of the icon. The first back side image 320 of the icon 310 can be displayed in case that an application corresponding to the icon 310 is executable in the back side display unit.

Hence, in case that a user intends to execute the application corresponding to the icon in the back side display unit, the user puts an input on the icon of the first back side image 320. This shall be described with reference to FIG. 4.

Figure 4:
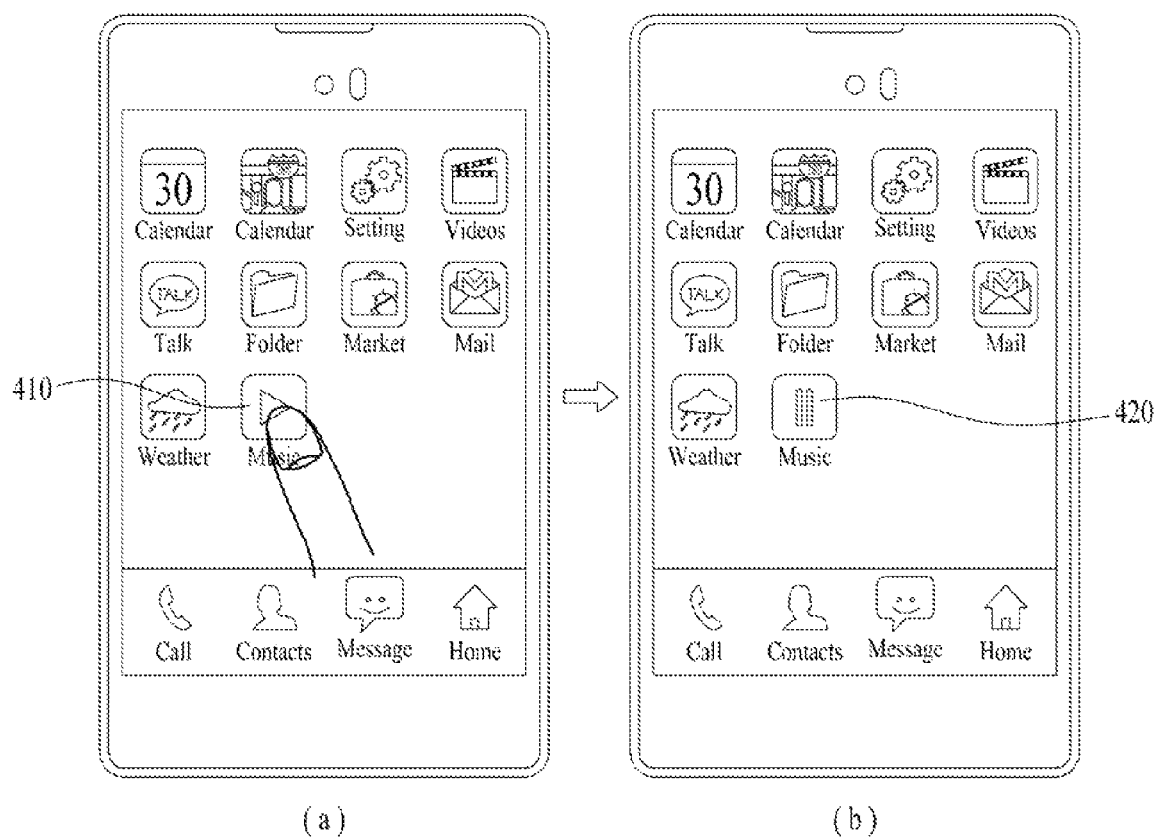
FIG. 4 is one embodiment of duplicating or moving to a back side display unit using an icon of a first back side image displayed in a front side display unit of a digital device.

FIG. 4 is one embodiment of duplicating or moving to a back side display unit using an icon of a first back side image displayed in a front side display unit of a digital device.

As shown in FIG. 4(a), having detected a second input signal for an icon displayed with a first back side image 410, the digital device may be able to execute an application corresponding to the icon in the back side display unit. The second input signal may include a touch input for the icon of the first back side image or a signal generated by a hovering input. In this case, the touch input of a user can be performed by such a various form as a drag, a flip, a consecutive touch, and the like.

And, as shown in FIG. 4(b), having detected the second input signal, the digital device may be able to change the first back side image 410 of the icon into a second back side image 420 of the icon. The second back side image 420 of the icon can be displayed only when an application corresponding to the icon is currently executed in the back side display unit.

As mentioned in the foregoing description, the digital device according to one embodiment may be able to provide the icon including the front side image, the first back side image, and the second back side image. In this case, the digital device may be able to provide a user with the information on the display unit in which an application corresponding to the icon is executed, whether the application is executable, and the like according to the image of the icon. This shall be described with reference to FIG. 5.

Figure 5:
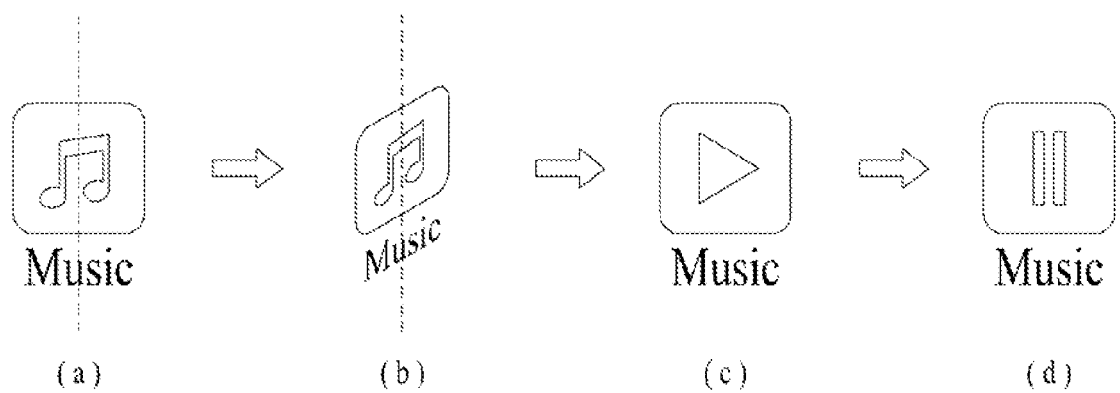
FIG. 5 is one embodiment of a front side image, a first back side image, and a second back side image of an icon.

FIG. 5 is one embodiment of a front side image, a first back side image, and a second back side image of an icon.

FIG. 5(a) is a diagram of one embodiment of an icon of a front side image. The front side image is a basic image of the icon corresponding to an application. Hence, the digital device may be able to display the icon of the front side image in a home screen of the front side display unit and the home screen of the back side display unit in case that the application is installed in the digital device. Hence, if a user sees the icon of the front side image, the user may be able to know that the application corresponding to the icon is executable in the front side display unit or the back side display unit in which the icon is displayed.

FIG. 5(b) is a diagram of one embodiment showing that an icon of a front side image is rotating. As mentioned in FIG. 3, having detected a first input signal for the icon of the front side image, the digital device may be able to flip the icon over by rotating the icon. Via the rotating icon, a user may be able to know that a back side will be displayed in a manner of flipping over the icon. And, the user may be able to make environment capable of executing an application corresponding to the icon in the back side display unit by an operation of rotating the icon only.

FIG. 5(c) is a diagram of one embodiment for an icon of a first back side image.

The digital device may be able to display the icon of the first back side image in response to the rotation of the icon. The first back side image can be displayed in case that an application corresponding to the icon is executable in the back side display unit.

Hence, in case that the icon on which the first input signal is detected is not executable in the back side display unit, the digital device may be able to maintain the icon of the front side image as it is. Hence, the user may be able to easily know whether an application corresponding to the icon is executable in the back side display unit according to whether the first back side image of the icon is displayed.

FIG. 5(d) is a diagram of one embodiment for an icon of a second back side image.

Having detected a second input signal for the icon of the first back side image, the digital device may be able to execute an application corresponding to the icon in the back side display unit. Yet, a user is currently facing the front side display unit. Hence, the digital device may be able to display the icon of the second back side image in order for the user to know that the application selected by the user is currently executed in the back side display unit.

In particular, the second back side image can be displayed only when the application corresponding to the icon is currently executed in the back side display unit. Hence, the user may be able to easily know whether the corresponding application is executed in the back side display unit by just seeing at least one image of the icon displayed in the front side display unit.

As mentioned in the foregoing description, the digital device according to one embodiment displays a back side by flipping the icon over according to the user input and may be able to execute the application corresponding to the icon in the back side display unit of the digital device. Hence, a user may be able to directly execute the application corresponding to the icon in the back side display unit in a manner of flipping the icon over and touching the icon, which is flipped over. In particular, the user may be able to easily execute the application in the back side display unit without flipping the digital device over to see the back side display unit.

Meanwhile, the digital device including the front side display unit and the back side display unit may be able to configure a home screen in each of the display units. Hence, the digital device according to one embodiment may be able to provide a user interface moving a specific icon provided in the front side display unit to the back side display unit or additionally providing a duplicated icon of the specific icon to a home screen of the back side display unit. This shall be described with reference to FIG. 6 to FIG. 7.

Figure 6:
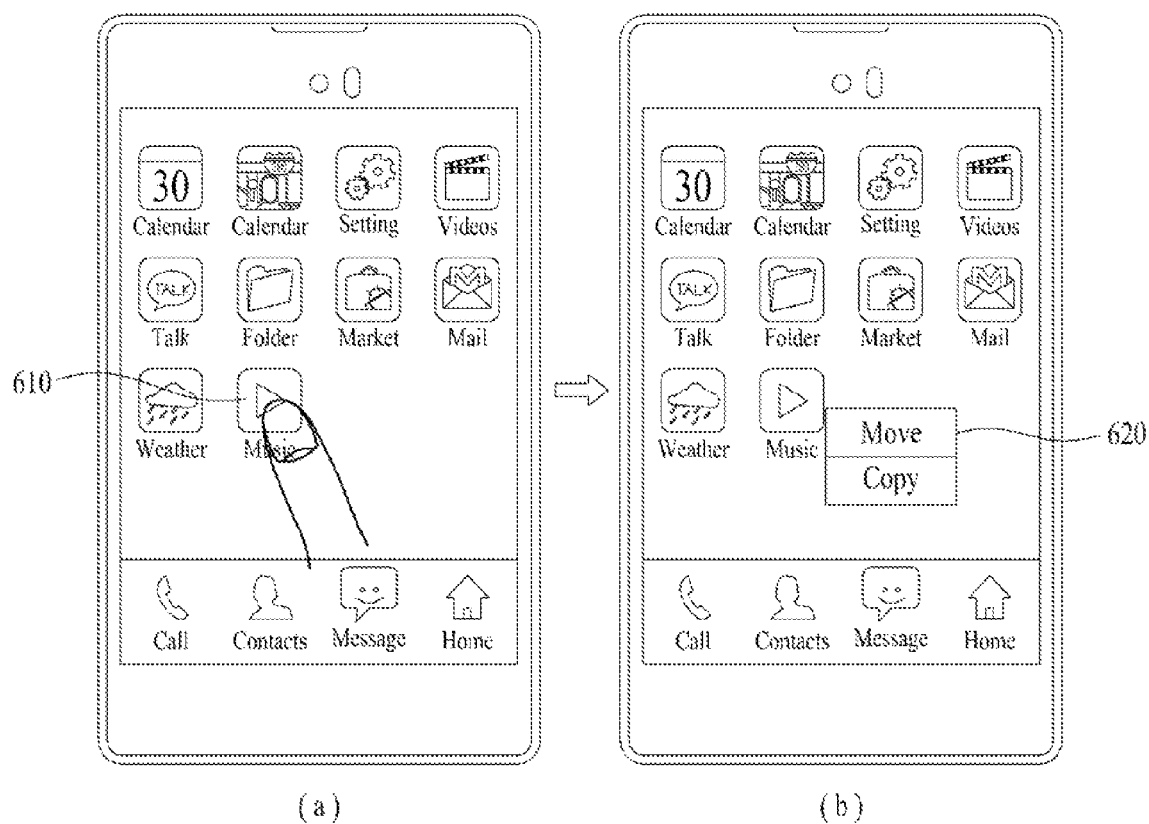
FIG. 6 is one embodiment providing a user interface to duplicate or move an icon in response to an input signal for the icon of a first back side image.

FIG. 6 is one embodiment providing a user interface to duplicate or move an icon in response to an input signal for the icon of a first back side image.

As mentioned earlier, the first back side image is an image displayed when a corresponding application of the icon is executable in the back side display. Hence, in case of the application executable in the back side display unit in response to the first input signal of a user, the digital device may be able to display the first back side image of the icon 610, as shown in FIG. 6(*a*).

While the user wants to execute the selected icon in the back side display unit, the user may want to move the icon to the back side display unit. And, the user may want to generate a duplicated icon of the selected icon 610 in the back side display unit. Hence, as shown in FIG. 6(*b*), if an input signal for the icon of the first back side image is detected, the digital device may be able to provide a user interface 620 necessary for a move or a duplication.

In this case, the input signal for the icon of the first back side image may include a signal generated by such a various form of touch input as a short touch of a user, a long press touch of the user, and the like. Yet, the input signal for the icon of the first back side image is distinguished from the aforementioned or after-mentioned input signals and may vary according to a configuration determined in advance.

Hence, the user may be able to move the icon 610 to the back side display unit or generate a duplicated icon in the back side display unit via an input for the user interface necessary for the move or the duplication.

Yet, the digital device may be able to move the icon to the back side display unit according to a kind of pre-configured input signal of a user without providing a separate user interface. This shall be described in detail with reference to FIG. 7.

Prior to that, one embodiment that the digital device provides a duplicated icon of an icon according to a kind of pre-configured input signal of a user without providing a separate user interface is explained.

The digital device may be able to detect a third input signal for the icon of the first back side image. The third input signal may include a signal generated by a long press touch of a user for the icon and may vary according to a configuration determined in advance.

Having detected the third input signal, the digital device generates a duplicate icon of the icon and may be then able to provide the generated duplicate icon in the back side display unit. Hence, the digital device may be able to make an identical icon exist in both the front side display unit and the back side display unit.

FIG. 7 is one embodiment moving an icon of a first back side image provided in a front side display unit to a back side display unit.

As shown in FIG. 7(*a*), the digital device may be able to detect a fourth input signal for the icon of the first back side image 710. The fourth input signal may include a signal generated by a touch input having direction of a user or long presses touch of a user for the icon and may vary according to a configuration determined in advance.

As shown in FIG. 7(*b*), it may be able to provide a graphic effect 720 of pushing the icon back in response to the fourth input signal. Since this corresponds to a case that a user intends to move the icon to the back side display unit, the digital device may be able to provide a realistic effect to the user in a manner of providing the graphic effect 720 of pushing the icon backward.

As shown in FIG. 7(*c*), having provided the graphic effect 720 of pushing the icon back, the digital device deletes the icon in the front side display unit after a pre-configured time and may be then able to provide the icon in the back side display unit.

As mentioned in the foregoing description, the digital device according to one embodiment may be able to move an icon between the front side display unit and the back side display unit by a touch input for the icon of a user only. Hence, the user may be able to conveniently edit a home screen of the front side display unit and the back side display unit.

Meanwhile, one embodiment for the icon provided in the front side display unit facing a user is described so far. Yet, as mentioned earlier, the back side display unit may be able to provide an icon and the aforementioned embodiments can be identically applied to the back side display unit, because the front side display unit can become the back side display unit according to a position of a user or a configuration and the back side display unit can also become the front side display unit according to the position of the user or the configuration. Hence, one embodiment that an application corresponding to the icon displayed in the back side display unit is executed in the front side display unit is explained with reference to FIG. 8.

Figure 8:
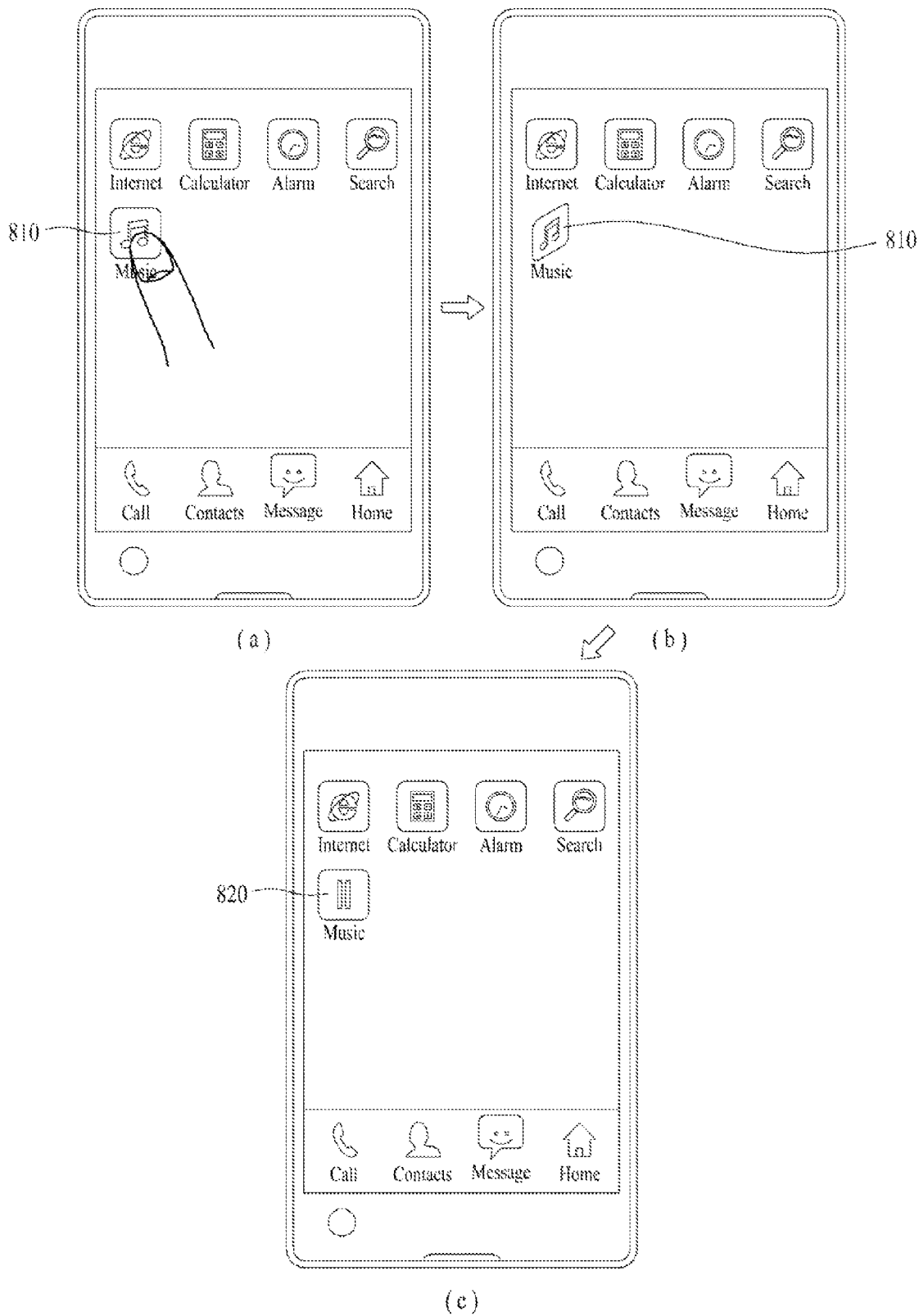
FIG. 8 is one embodiment executing an application corresponding to an icon displayed in a back side display unit in a front side display unit.

FIG. 8 is one embodiment executing an application corresponding to an icon displayed in a back side display unit in a front side display unit.

As shown in FIG. 8(*a*), the back side display unit may be able to provide a home screen and the home screen may include at least one icon. In this case, the at least one icon can be displayed with a front side image. Since the front side image indicates that the icon is executable in the displayed unit, a user may be able to know that the icon is executed in the back side display unit via the icon of the front side image. In this case, the digital device may be able to detect a first input signal for the icon 810 of the front side image.

As shown in FIG. 8(*b*), having detected the first input signal, the digital device rotates the icon 810 and may be then able to execute an application corresponding to the icon 810 in the front side display unit.

As shown in FIG. 8(c), the digital device may be able to convert a front side image of the icon into a back side image 820. Hence, a user may be able to know that the application corresponding to the icon 810 is currently executed in the front side display unit only by seeing the back side image 820 of the icon displayed in the back side display unit.

In other word, if the digital device detects the input signal for the icon of the front side image displayed in the front side display unit, the digital device may be able to rotate the icon. And, the digital device may be able to execute the application corresponding to the icon in the back side display unit while rotating the icon through 180 degrees. And, the digital device may be able to convert the icon of the front side image into the icon of the back side image according to the result of rotation of the icon.

As mentioned in the foregoing description, the digital device according to one embodiment of FIG. 8 provides the icon including two images only containing the front side image and the back side image unlike the digital device shown in FIG. 3 to FIG. 5.

In particular, the digital device may not distinguish the first back side image indicating whether an application is executable in the back side display unit from the second back side display unit indicating the application is currently executed in the back side display unit, because there exist lots of cases of the application executable in both the front side display unit and the back side display unit.

Hence, if a user input for flipping over an icon is detected, the digital device may be able to rotate the icon. And, after the rotation of the icon or simultaneously with the rotation, the digital device may be able to immediately execute the application corresponding to the icon in the back side display unit without waiting for an additional input of the user.

As mentioned in the foregoing description, the icon provided by the digital device according to a different embodiment may be able to have one front side image and one back side image only. Yet, for clarity of explanation, one embodiment that an icon includes a front side image, a first back side image, and a second back side image is explained as a representative embodiment in the following description.

Meanwhile, as mentioned earlier, a user facing the front side display unit may be able to execute an application corresponding to an icon in the back side display unit by rotating the icon. In this case, the digital device may be able to simultaneously execute the application corresponding to the icon in both the back side display unit and the front side display unit.

And, the digital device according to one embodiment may be able to provide a user interface capable of controlling the application currently executed in the back side display unit, controlled by a user.

Figure 9:
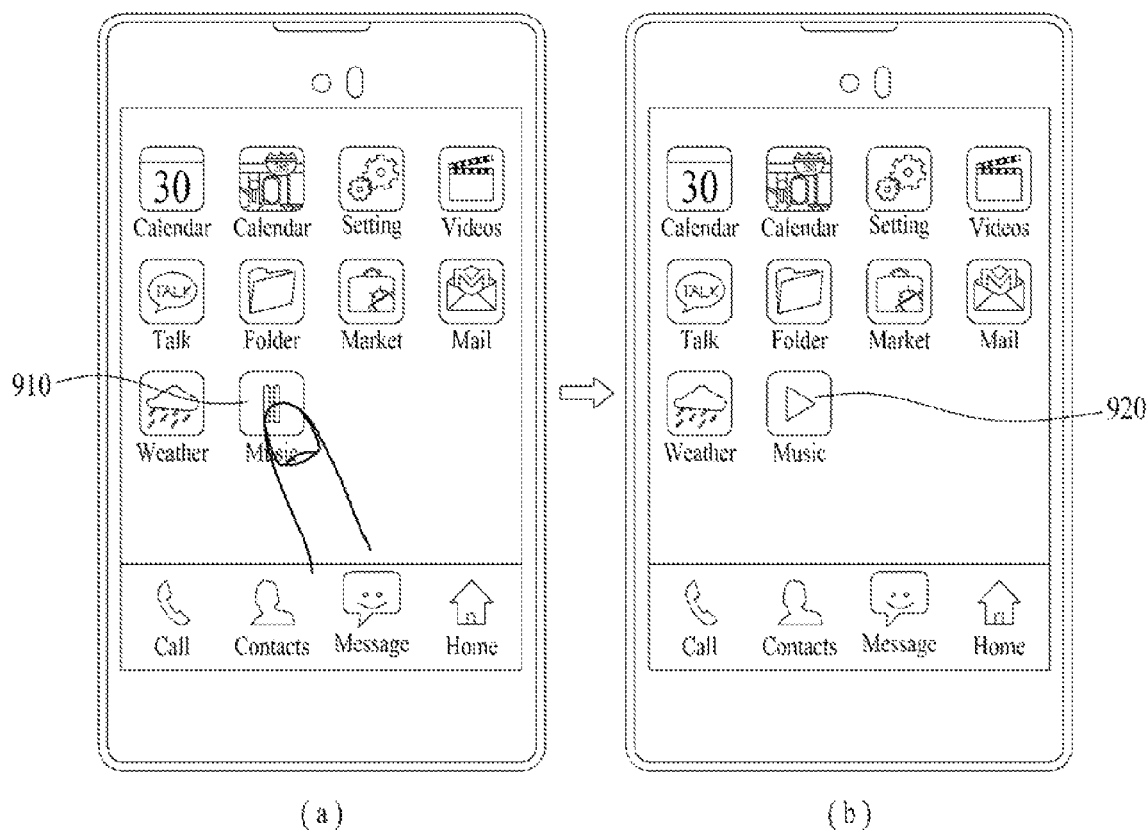
FIG. 9 is one embodiment displaying an icon of a first back side image in response to an input signal for an icon of a second back side image.

FIG. 9 is one embodiment displaying an icon of a first back side image in response to an input signal for an icon of a second back side image.

As shown in FIG. 9(a), in case that an icon of a second back side image 910 is displayed in the front side display unit, a user may be able to know that an application corresponding to the icon of the second back side image 910 is currently executed in the back side display unit. In this case, the digital device may be able to detect a fifth input signal for the icon of the second back side image 910.

Having detected the fifth input signal, the digital device may be able to terminate execution of the application corresponding to the icon. The fifth input signal may include a touch input of a user for the icon of the second back side image 910 or a signal generated by a hovering input and the like and may be non-limited to a specific form.

As shown in FIG. 9(b), having terminated the execution of the application in the back side display unit, the digital device may be able to convert the second back side image 910 of the icon into the first back side image 920 of the icon. Hence, the user may be able to easily know that execution of the application is stopped in the back side display unit and the application is in a state of executable via the converted first back side image 920.

As mentioned earlier, the digital device according to one embodiment may be able to terminate the application executed in the back side display unit via a user input for the first back side image and the second back side image. In particular, the digital device may be able to configure the first back side image as an image related to a function executing the application and may be able to configure the second back side image as an image related to a function terminating the application. In doing so, the digital device may be able to enable a user to intuitively know a state of the application if the user sees the image of the icon only.

Besides, the digital device may be able to provide an environment capable of controlling an application executed in the back side display unit by a user in a manner of providing a control interface controlling the application corresponding to an icon.

Figure 10:
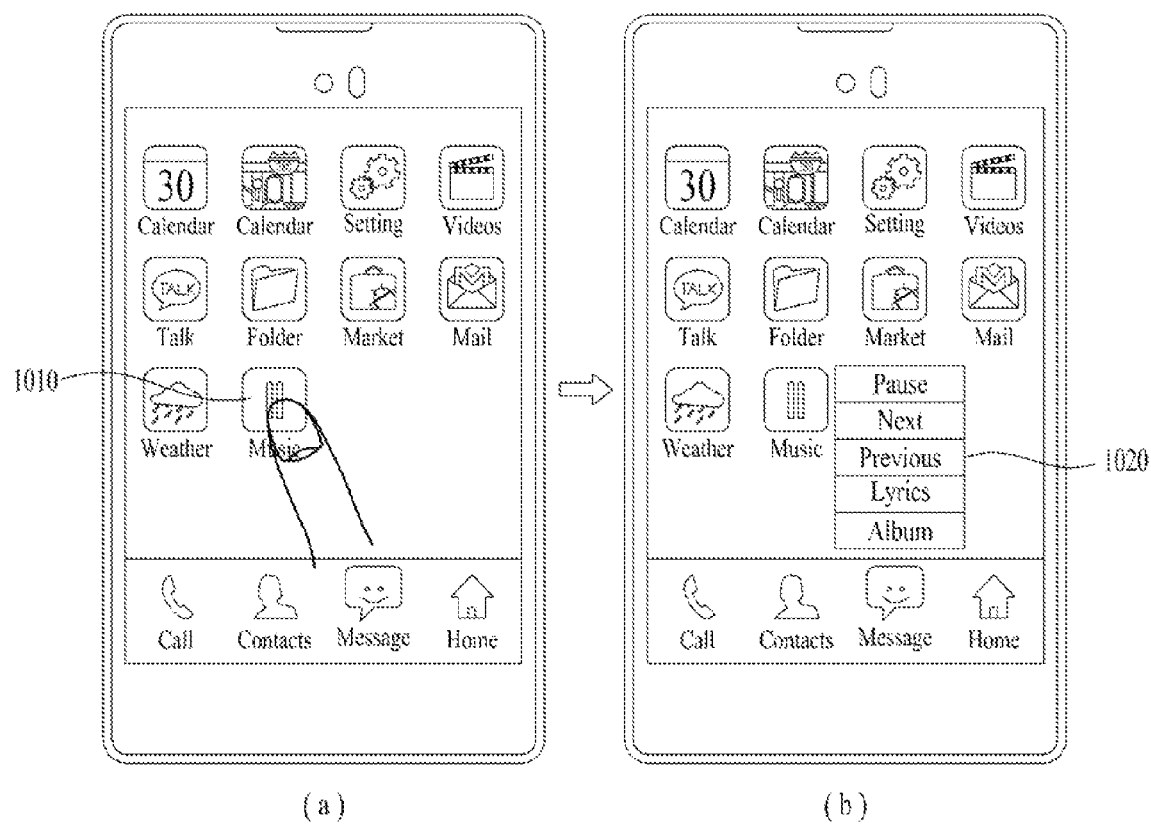
FIG. 10 is one embodiment providing a control interface in response to an input signal for an icon of a second back side image.

FIG. 10 is one embodiment providing a control interface in response to an input signal for an icon of a second back side image.

As shown in FIG. 10(a), in case that an icon of a second back side image 1010 is displayed in the front side display unit, a user may be able to know that an application corresponding to the icon of the second back side image 1010 is currently executed in back side display unit. In this case, the digital device may be able to detect a sixth signal for the icon of the second back side image 1010.

Having detected the sixth input signal, the digital device, as shown in FIG. 10(b), may be able to provide a control interface 1020 controlling the application corresponding to the icon. The sixth input signal may include a various form of touch input of a user for the icon of the second back side image 1010 or a signal generated by a hovering input and the like. Although the sixth input signal may be non-limited to a specific form, the sixth input signal can be configured to be distinguished from the aforementioned fifth input signal and the after-mentioned eighth input signal.

The control interface 1020 is an interface to control the application corresponding to an icon. Hence, configuration and content of the control interface 1020 may vary according to a kind of the application.

Since the application according to one embodiment in FIG. 10 corresponds to a music player application, the control interface 1020 may be able to include a menu to perform at least one function selected from the group consisting of a stopping a music currently played, a playing a next track, a playing a previous track, a providing a lyrics information, and a providing an album information.

Meanwhile, the embodiments controlling the application corresponding to the icon in the back side display unit using the icon of the second back side image are explained in FIG. 9 to FIG. 10. Yet, a display screen of the front side display unit and the display screen of the back side display unit can be switched with each other using the icon of the second back side image. This shall be described with reference to FIG. 11 to FIG. 12.

Figure 11:
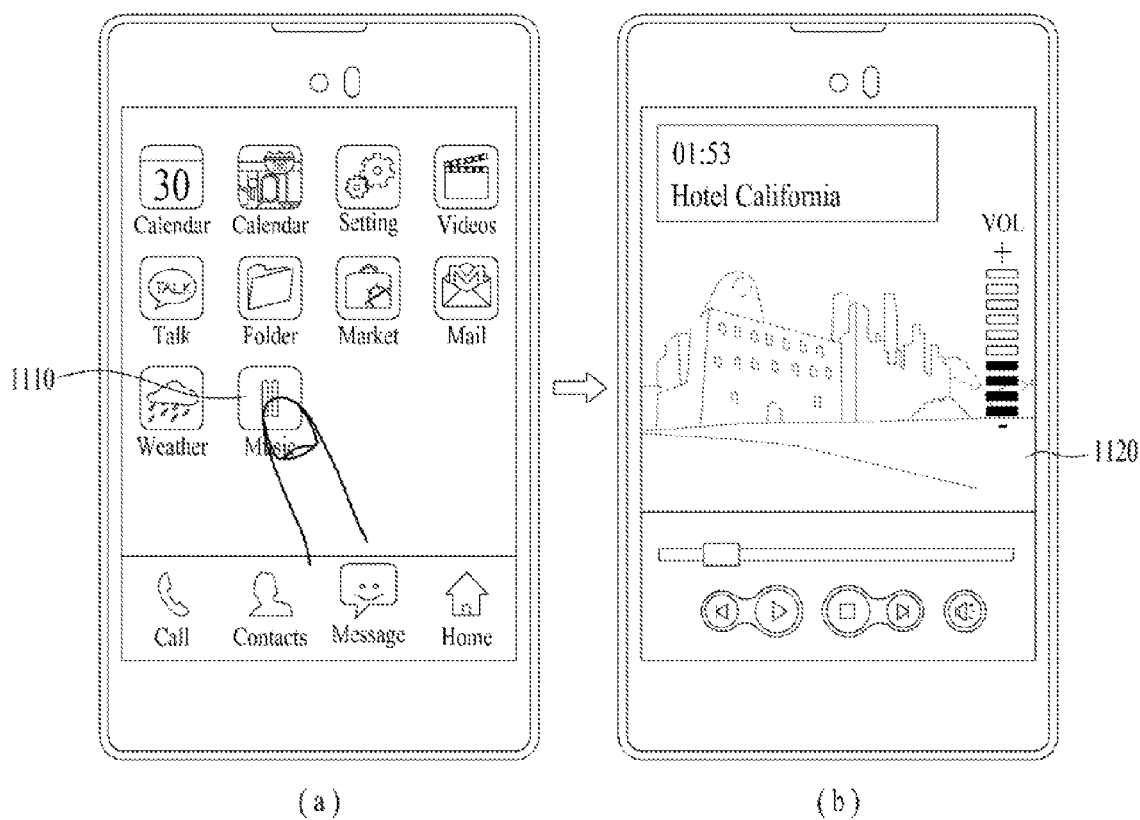
FIG. 11 is one embodiment switching a display screen of a front side display unit with the display screen of a back side display unit in response to an input signal for an icon of a second back side image.

FIG. 11 is one embodiment switching a display screen of a front side display unit with the display screen of a back side display unit in response to an input signal for an icon of a second back side image.

As shown in FIG. 11(a), the digital device may be able to display an icon 1110 corresponding to an application currently executed in the back side display unit with a second back side image.

And, the digital device may be able to detect a seventh input signal for the icon 1110 of the second back side image. The seventh input signal may include a various form of touch input of a user for the icon of the second back side image 1110 or a signal generated by a hovering input and the like and may vary according to a configuration determined in advance.

As shown in FIG. 11(b), having detected the seventh input signal, the digital device may be able to display an execution screen of the application corresponding to the icon in the front side display unit. As mentioned in the foregoing description, whenever a user wants, the digital device may be able to easily provide an environment controlling the application in a manner of displaying the execution screen currently executed in the back side display unit in the front side display unit without flipping the digital device over. In this case, the digital device may be able to synchronize the execution screen displayed in the front side display unit with the execution screen displayed in the back side display unit.

Yet, displaying an identical execution screen in both the front side display unit and the back side display unit at the same time may waste a resource of the digital device. Hence, the digital device according to a different embodiment may be able to switch a display screen of the front side display unit and that of the back side display unit. This shall be described with reference to FIG. 12.

Figure 12:
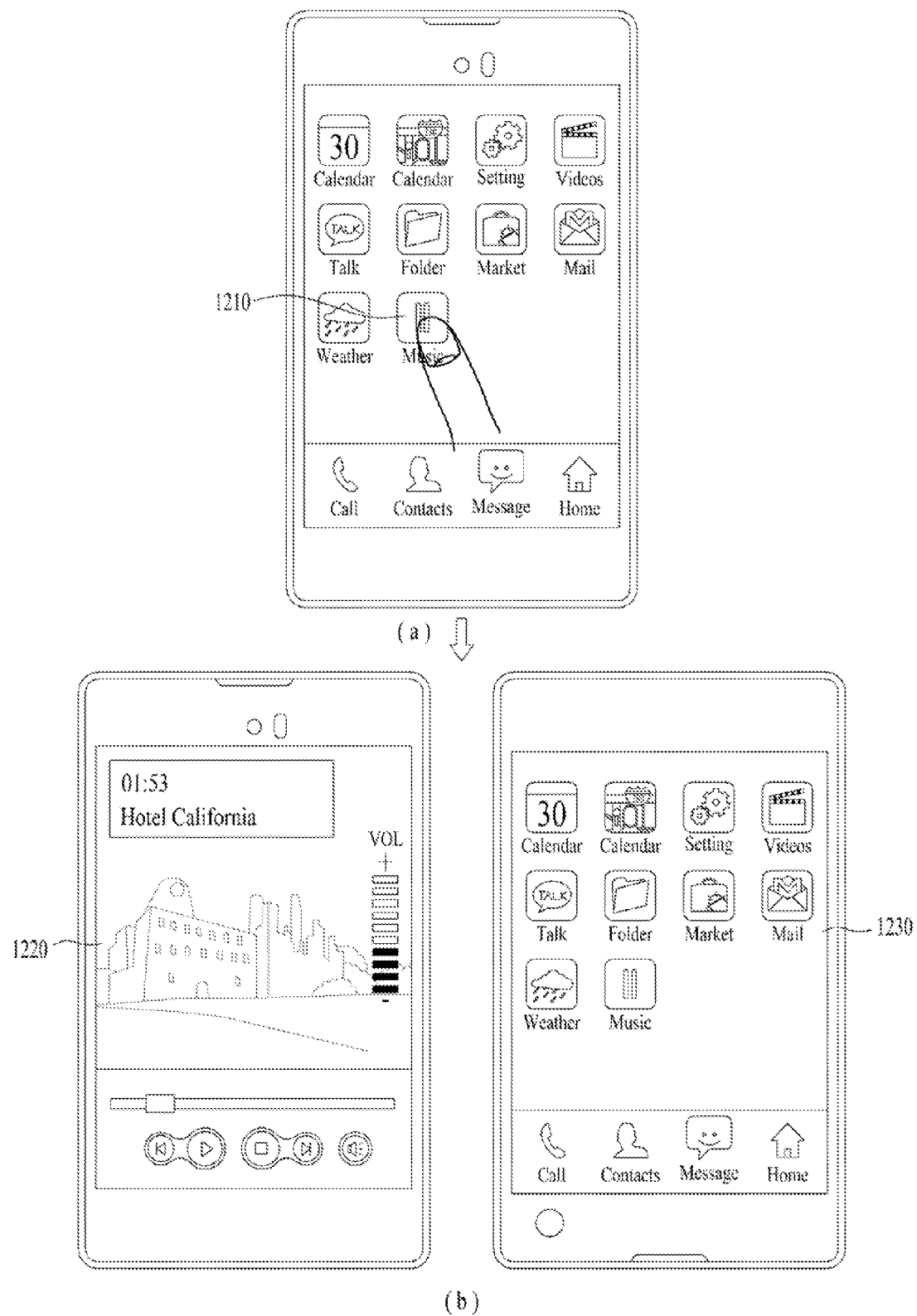
FIG. 12 is a different embodiment switching a display screen of a front side display unit with the display screen of a back side display unit in response to an input signal for an icon of a second back side image.

FIG. 12 is a different embodiment switching a display screen of a front side display unit with the display screen of a back side display unit in response to an input signal for an icon of a second back side image.

As shown in FIG. 12(a), the digital device may be able to display an icon 1210 corresponding to an application currently executed in the back side display unit with a second back side image.

And, the digital device may be able to detect an eighth input signal for the icon 1210 of the second back side image. The eighth input signal may include a various form of touch input of a user for the icon of the second back side image 1210 or a signal generated by a hovering input and the like and may vary according to a configuration determined in advance.

As shown in FIG. 12(b), having detected the eighth input signal, the digital device may be able to switch an image data displayed in the front side display unit with the image data displayed in the back side display unit. Hence, the front side display unit 1220 may be able to display an execution screen of the application corresponding to the icon 1210 and the back side display unit 1230 may be able to display a home screen of the front side display unit.

As mentioned in the foregoing description, the digital device according to a different embodiment switches the image data displayed in the front side display unit with the image data displayed in the back side display unit according to a request of a user and may be then able to not flip over the digital device in case that the user should control the application currently executed in the back side display unit. In particular, it is helpful in case that the user performs an additional job on the corresponding application.

And, after the image data is switched, if there does not exist an additional user input, the digital device may be able to reduce battery consumption by switching the back side display unit to an off state after a pre-configured time. The off state is a state that the back side display unit is waiting for a user input or an inside event occurrence and may include a blank screen state, which is not displaying the image data.

And, if the back side display unit is switched from the off state to an on state, the digital device may be able to convert the first back side image displayed in the back side display unit into the front side image.

In other word, if an input signal of a user for the icon of the front side image is detected, the digital device may be able to display the first back side image to indicate a state capable of executing in the front side display unit. Hence, if additional user input for the first back side image is detected, the digital device may be able to convert the first back side image into a second back side image. And, if an additional user input is not detected for a pre-configured time, the digital device may be able to convert the first back side image into the front side image again.

As mentioned in the foregoing description, since the icon of the first back side image corresponds to a state waiting for an additional input of the user, if the display unit is switched from the off state to the on state, the digital device may be able to convert the first back side image into the front side image in order not to stand by the user input. Since the state corresponds to a state that a prescribed time passed, it is natural to see that the user has no intention of additional input.

In the same manner, if the front side display unit is switched from the off state to the on state, the digital device may be able to convert the first back side image of the icon displayed in the front display unit into the front side image.

Meanwhile, a plural number of applications can be installed in the digital device. And, a plurality of the applications can be simultaneously executed in a manner of multitasking. Yet, in case of a digital device such as a smart phone, there exist a problem that it is unable to directly check whether a plurality of the applications are executed in a home screen, although there exist the applications simultaneously executed by multitasking.

Hence, the digital device according to one embodiment may be able to inform a user of whether a plurality of the applications are executed using the front side image, the first back side image, or the second back side image of the icon. And, the digital device may be able to display the icon executed by multitasking with a separate image.

FIG. 13 is one embodiment differently displaying an image of an icon in response to a multitasking application.

As shown in FIG. 13(a), the digital device may be able to display at least one icon in response to the application installed in the front side display unit. In this case, the digital device may be able to display the icon 1310 corresponding to the application currently executed in the back side display unit with a second back side image.

In this case, in case that a user makes a request to see the application executed by multitasking, the digital device may be able to display the icons 1320/1330/1340 corresponding to the applications executed by multitasking with the second back side images as shown in FIG. 13(b).

One embodiment like FIG. 13 is very helpful if a user wants to terminate the application executed in a background to reduce battery consumption of the digital device. In particular, the digital device may be able to easily indicate the application capable of being terminated to reduce the battery consumption by displaying the multitasking application with the second back side image. And, the digital device may be able to display the multitasking application with the first back side image and may be able to display the application with an icon of an image, which is individually configured.

FIG. 14 is a flowchart for a method of controlling a digital device according to one embodiment.

First of all, as mentioned in FIG. 2, the digital device may be able to display at least one icon of a front side image in a front side display unit. The front image may be able to indicate that an icon is currently executable in a display unit in which the icon is displayed.

As mentioned in FIG. 3 and FIG. 5, the digital device may be able to detect a first input signal for at least one icon of a front side image [S1410]. The first input signal may include a signal generated by a flip touch and the like of a user on the icon.

Having detected the first input signal, the digital device may be able to rotate the icon of which the first input signal is detected [S1420]. A rotation direction can be determined by the first input signal. The digital device rotates the icon through 180 degrees and may be then able to convert the front side image of the icon into a first back side image according to a rotation result [S1430]. The first back side image can be displayed in case that an application corresponding to the icon is executable in the back side display unit.

As mentioned in FIG. 4 to FIG. 5, the digital device may be able to detect a second input signal for the icon displayed with the first back side image [S1440]. The digital device may be able to execute an application corresponding to the icon in the back side display unit according to the second input signal [S1450]. In this case, the digital device may be able to execute the application corresponding to the icon in the front side display unit as well as the back side display unit according to a configuration determined in advance.

And, the digital device may be able to convert the first back side image of the icon into the second back side image of the icon [S1460]. The second back side image can be displayed in case that the application corresponding to the icon is currently executed in the back side display unit only.

Yet, in case that the second input signal for the icon displayed with the first back side image is not detected, the digital device may be able to display the first back side image until the second input signal is detected. Or, in case that the second input signal for the icon displayed with the first back side image is not detected for a pre-configured time, the digital device may be able to display the icon of the front image again after the pre-configured time passed.

Meanwhile, as mentioned in FIG. 6 to FIG. 7, in case that a third input signal for the icon of the first back side image is detected, the digital device generates a duplicated icon of the icon and may be able to provide the duplicated icon in the back side display unit. And, in case that a fourth input signal for the icon of the first back side image is detected, the digital device deletes the icon in the front side display unit and may be able to move the icon to the back side display unit.

Moreover, for clarity of explanation, each diagram is explained in a manner of being divided. Yet, it is possible to design a new embodiment to implement the new embodiment by combining the embodiments, which are described in each of the diagrams. And, according to the necessity of those skilled in the art, designing a recording media readable by the computer, which has recorded a program for executing the previously explained embodiments, also belongs to a scope of a right.

A digital device according to one embodiment and a controlling method therefor may not limitedly apply to the composition and method of the aforementioned embodiments. The aforementioned embodiments may be configured in a manner of being selectively combined the whole of the embodiments or a part of the embodiments to achieve various modifications.

Meanwhile, a method of controlling a digital device can be implemented with a code readable by a processor in a recording media readable by the processor, which is equipped in a network device. The recording media readable by the processor may include all kinds of recording devices for storing data capable of being read by the processor. The examples of the recording media readable by the processor may include a ROM, a RAM, a CD-ROM, a magnetic tape, a floppy disc, an optical data storing device and the like. And, implementing in a form of a carrier wave such as a transmission via an internet and the like is also included. The recording media readable by the processor are distributed to the computer systems connected by a network and codes readable by the processor can be stored and executed in a manner of being distributed.

While the present specification has been described and illustrated herein with reference to the preferred embodiments and diagrams thereof, the present specification may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:
1. A digital device, comprising:
a front side display unit including a touch screen;
a back side display unit installed in the opposite side of the device from the front side display unit; and
a processor configured to:
control the front side display unit to display an icon of a front side image associated with a first application in the front side display unit, wherein the front side image indicates a state capable of executing the first application,
detect a first input signal for the icon of the front side image,
in response to detecting the first input signal, determine if the first application is executable in the back side display unit, and if the first application is executable in the back side display unit, control the front side display unit to:
rotate the icon of the front side image on which the first input signal is detected, and
convert the icon of the front side image to an icon of a first back side image associated with the first application, wherein the icon of the first back side image is displayed in the front side display unit only if the first application is executable in the back side display unit,
detect a second input signal for the icon of the first back side image, in response to detecting the second input signal for the icon of the first back side image:
  execute the first application in the back side display unit according to the second input signal for the icon of the first back side image, and
  control the front side display unit to convert the icon of the first back side image to an icon of a second back side image associated with the first application, wherein the icon of the second back side image is displayed in the front side display unit only if the first application is currently executed in the back side display unit,
  detect a third input signal for the icon of the second back side image, in response to detecting the third input signal:
  terminate the execution of the first application, and
  control the front side display unit to convert the icon of the second back side image to the icon of the first back side image,
  wherein if an additional user input is not detected for a pre-configured time, the processor is configured to control the front side display unit to convert the first back side image into the front side image again.

2. The digital device of claim 1, wherein the back side display unit includes a touch screen, and
  wherein if the icon of the front side image is converted to the icon of the first back side image, and a fourth input signal for the icon of the first back side image is detected, the processor controls the front side display unit to generate a duplicate icon and controls the back side display unit to display the duplicate icon in the back side display unit.

3. The digital device of claim 1, wherein the back side display unit includes a touch screen, and
  wherein if the icon of the front side image is converted to the icon of the first back side image and a fifth input signal for the icon of the first back side image is detected, the processor controls the front side display unit to delete the icon in the front side display unit and controls the back side display unit to display the icon in the back side display unit.

4. The digital device of claim 1, wherein if the icon of the front side image is converted to the icon of the first back side image, and the icon of the first back side image is converted to the second back side image and a sixth input signal for the icon of the second back side image is detected, the processor controls the front side display unit to provide a control interface in the front side display unit to control the first application.

5. The digital device of claim 1, wherein if the icon of the front side image is converted to the icon of the first back side image, and the icon of the first back side image is converted to the second back side image and a seventh input signal for the icon of the second back side image is detected, the processor controls the front side display unit to display an execution screen of the first application in the front side display unit.

6. The digital device of claim 1, wherein the back side display unit includes a touch screen, and
  wherein if the icon of the front side image is converted to the icon of the first back side image, and the icon of the first back side image is converted to the second back side image and an eighth input signal for the icon of the second back side image is detected, the processor controls the front side display unit and the back side display unit to switch a first image data displayed in the front side display unit with a second image data displayed in the back side display unit.

7. The digital device of claim 1, wherein if the icon of the front side image is converted to the icon of the first back side image and the front side display unit is converted from an off state to an on state, the processor controls the front side display unit to convert the icon of the first back side image displayed in the front side display unit to the icon of the front side image.

8. The digital device of claim 1, wherein the processor detects at least one application currently executed by multitasking in the back side display unit, and
  in response to detecting at least one application currently executed by multitasking in the back side display unit, controls the front side display unit to display at least one icon of the second back side image corresponding to each of the detected at least one application executed in the back side display unit.

9. A method of controlling a digital device including a front side display unit and a back side display unit, the method comprising:
  controlling the front side display unit to display an icon of a front side image associated with a first application in the front side display unit, wherein the front side image indicates a state capable of executing the first application:
  detecting a first input signal for the icon of the front side image;
  in response to detecting the first input signal, determine if the first application is executable in the back side display unit, and if the first application is executable in the back side display unit, controlling the front side display unit to:
  rotate the icon of the front side image on which the first input signal is detected; and
  convert the icon of the front side image to an icon of a first back side image associated with the first application, wherein the icon of the first back side image is displayed in the front side display unit only if the first application is executable in the back side display unit;
  detecting a second input signal for the icon of the first back side image;
  in response to detecting the second input signal:
  executing the first application in the back side display unit according to the second input signal; and
  controlling the front side display unit to convert the icon of the first back side image to an icon of a second back side image associated with the first application, wherein the icon of the second back side image of the icon is displayed in the front side display unit only if the first application is currently executed in the back side display unit;
  detecting a third input signal for the icon of the second back side image; and
  in response to detecting the third input signal:
  terminating the execution of the first application according to the second input signal; and
  controlling the front side display unit to convert the icon of the second back side image to the icon of the first back side image,
  wherein the front side display unit includes a touch screen, and
  wherein if an additional user input is not detected for a pre-configured time, controlling the front side display unit to convert the first back side image into the front side image again.

10. The method of claim 9, wherein the back side display unit includes a touch screen,
further comprising:
detecting a fourth input signal for the icon of the first back side image; and
if the icon of the front side image is converted to the icon of the first back side image and the fourth input signal for the icon of the first back side image is detected, controlling the front side display unit to generate a duplicate icon and controlling the back side display unit to display the duplicate icon in the back side display unit.

11. The method of claim 9, wherein the back side display unit includes a touch screen,
further comprising:
detecting a fifth input signal for the icon of the first back side image; and
if the icon of the front side image is converted to the icon of the first back side image and the fifth input signal for the icon of the first side image is detected, controlling the front side display unit to delete the icon in the front side display unit and controlling the back side display unit to display the icon in the back side display unit.

12. The method of claim 9, wherein if the icon of the front side image is converted to the icon of the first back side image and the icon of the first back side image is converted to the second back side image,
further comprising:
detecting a sixth input signal for the icon of the second back side image; and
in response to detecting the sixth input signal for the icon of the second back side image, controlling the front side display unit to provide a control interface in the front side display unit to control the first application.

13. The method of claim 9, wherein if the icon of the front side image is converted to the icon of the first back side image and the icon of the first back side image is converted to the second back side image,
further comprising:
detecting a seventh input signal for the icon of the second back side image; and in response to detecting the seventh input signal for the icon of the second back side image, controlling the front side display unit to display an execution screen of the first application in the front side display unit.

14. The method of claim 9, wherein the back side display unit includes a touch screen, and
wherein if the icon of the front side image is converted to the icon of the first back side image and the icon of the first back side image is converted to the second back side image,
further comprising:
detecting an eighth input signal for the icon of the second back side image; and
in response to detecting the eighth input signal for the icon of the second back side image, controlling the front side display unit and the back side display to switch a first image data displayed in the front side display unit with a second image data displayed in the back side display unit.

15. The method of claim 9, further comprising:
detecting a state of the front side display unit converted from an off state to an on state; and
in response to detecting a state of the front side display unit converted from an off state to an on state, if the icon of the front side image is converted to the icon of the first back side image, controlling the front side display unit to convert the icon of the first back side image displayed in the front side display unit to the icon of the front side image.

16. The method of claim 9, further comprising:
detecting at least one application currently executed by multitasking in the back side display unit; and
in response to detecting at least one application currently executed by multitasking in the back side display unit, controlling the front side display unit to display at least one icon of the second back side image corresponding to each of the detected at least one application executed in the front back side display unit.

* * * * *